United States Patent
Salzano et al.

(10) Patent No.: US 8,914,791 B1
(45) Date of Patent: Dec. 16, 2014

(54) METHOD FOR UPDATING OF WIRELESS TERMINAL SOFTWARE

(75) Inventors: Doreen Salzano, Valley Center, CA (US); Shyam T. Shyamalan, Hillsborough, NJ (US); Arthe Sampath, Bridgewater, NJ (US); Martin Abbott, Flemington, NJ (US); Kathleen Chylinski, Bridgewater, NJ (US); Farook Kaleem, Piscataway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 526 days.

(21) Appl. No.: 12/956,652

(22) Filed: Nov. 30, 2010

(51) Int. Cl.
*G06F 9/44* (2006.01)
*G06F 9/445* (2006.01)

(52) U.S. Cl.
USPC ............ 717/173; 717/120; 717/170; 717/178

(58) Field of Classification Search
CPC ................. G06F 8/61; G06F 8/65; G06F 8/71
See application file for complete search history.

(56) References Cited

U.S. PATENT DOCUMENTS

| 7,200,390 | B1 | 4/2007 | Henager et al. | |
|---|---|---|---|---|
| 7,698,701 | B2 * | 4/2010 | Goring et al. | 717/170 |
| 8,375,360 | B2 * | 2/2013 | I'Anson | 717/120 |
| 8,375,385 | B1 * | 2/2013 | Harel et al. | 717/173 |
| 2003/0041127 | A1 * | 2/2003 | Turnbull | 709/220 |
| 2005/0039178 | A1 * | 2/2005 | Marolia et al. | 717/168 |
| 2006/0026304 | A1 | 2/2006 | Price | |
| 2006/0080659 | A1 * | 4/2006 | Ganji | 717/178 |
| 2006/0106804 | A1 | 5/2006 | Chande | |
| 2007/0169093 | A1 * | 7/2007 | Logan et al. | 717/168 |
| 2009/0183150 | A1 * | 7/2009 | Felts | 717/173 |
| 2010/0136960 | A1 * | 6/2010 | Knezevic | 455/418 |
| 2011/0138376 | A1 * | 6/2011 | Kim et al. | 717/173 |

OTHER PUBLICATIONS

O. Riva, Contory: a middleware for the provisioning of context information on smart phones, Nov. 2006, 21 pages.*
A. Meads, A Holistic Approach to Mobile Service Provisioning, Nov. 2009, 5 pages.*

* cited by examiner

*Primary Examiner* — Thuy Dao

(57) ABSTRACT

When a user of the wireless terminal connects the wireless terminal to a computer, the wireless terminal detects the connection and determines whether the connection is the first time for connection to the computer. If the connection is the first time connection, the wireless terminal obtains information of wireless terminal software on the wireless terminal. Then, the wireless terminal causes the computer to access a server via a network and to download to the computer a software upgrading assistance (SUA) program from the server. The SUA program assists update of the wireless terminal software.

20 Claims, 3 Drawing Sheets

METHOD FOR UPDATING OF WIRELESS TERMINAL SOFTWARE

TECHNICAL FIELD

The present disclosure relates to methods and equipment for updating wireless terminal software on a wireless terminal, for example, a wireless phone, through a computer.

BACKGROUND

A customer who purchases and uses his/her wireless terminal may have to update wireless terminal software installed on the wireless terminal because the software may have to be fixed or a new version of the software may be available. In such a case, currently the customer has to download updated software over the air (i.e., through a wireless network) or has to go to a wireless terminal shop to have the software of his/her wireless terminal updated. When the data size of the updated software is large, downloading through the wireless network would be time consuming. Further, taking his/her wireless terminal to the shop would also be time consuming for the customer. Accordingly, there is a need to more easily download updated wireless terminal software.

SUMMARY

The teachings herein alleviate one or more of the above noted problems with methods for updating wireless terminal software on a wireless terminal by utilizing a computer.

One example is a method for updating wireless terminal software on a wireless terminal including the following steps. When a user of the wireless terminal connects the wireless terminal to a computer, for example, a PC, the wireless terminal detects the connection and determines whether the connection is the first time for connection of the wireless terminal to the computer. If the connection is the first time connection, the wireless terminal obtains information of wireless terminal software on the wireless terminal. Then, the wireless terminal causes the computer to access a server via a network and to download to the computer a software upgrading assistance program from the server. The software upgrading assistance (SUA) program assists update of the wireless terminal software.

The downloaded SUA program is executed by the computer. The computer determines whether the wireless terminal software should be updated. When the computer determines that the wireless terminal software should be updated, the computer inquires of the user of the computer whether the user wishes to update the wireless terminal software or not. If the computer receives an input from the user indicating that the user wishes to update, the computer downloads the updating program through a server which provides the updating program and updates the wireless terminal software by executing the updating program. When the SUA program is downloaded, a device driver for the wireless terminal may also be downloaded together with the SUA program.

The SUA program may include a utility tool (UT) and a monitor tool (MT). The UT may manage downloading the update programs and the MT may monitor the availability of the update programs. When the MT is executed by the computer, the MT becomes a resident program and will be present on the computer's task tray. The MT may periodically check for availability of an updating program for the wireless terminal software. If an updating program is available, the MT executed by the computer notifies the user of the availability.

The MT executed by the computer may access a website designated by the SUA program to check for availability of the updating program. The website may be a website of a manufacturer of the wireless terminal, or a website of a vender of the wireless terminal software.

The method may further include the following steps. When the wireless terminal determines that the connection is not the first time but the second time or a later connection, the wireless terminal causes the computer to execute the SUA program which has already been downloaded. The computer determines whether the wireless terminal software should be updated. When the computer determines that the wireless terminal software should be updated, the computer inquires of the user of the computer whether the user wishes to update the wireless terminal software or not. If the computer receives an input from the user indicating that the user wishes to update, the computer downloads the updating program through a server which provides the updating program and updates the wireless terminal software by installing or executing the updating program.

The method may further include the following steps. Before the downloading of the SUA program, the computer may inquire of the user of the computer whether the user wishes to download the SUA program. The SUA program is downloaded responsive to receiving an input from the user indicating that the user wishes to download the SUA program.

In another example, a wireless terminal includes a wireless transceiver for communication via a wireless network, a processor coupled to the wireless transceiver and a storage device storing programs including wireless terminal software and a downloading program. The downloading program includes instructions which, when executed by the processor, cause the wireless terminal to perform several functions. When the wireless terminal is connected to a computer, for example, a PC, the wireless terminal detects the connection and determines whether the connection is the first time for connection of the wireless terminal to the computer. When the connection is the first time connection, the wireless terminal obtains information of the wireless terminal software of the wireless terminal, and causes the computer to access a server via a network and to download a software upgrading assistance (SUA) program from the server which assists update of the wireless terminal software.

The instructions of the downloading program may further cause the wireless terminal to perform the following function. When the wireless terminal determines that the connection is the second time or later connection, the wireless terminal causes the computer to execute the downloaded SUA program which has already been downloaded to the computer.

When the SUA is downloaded, a device driver for the wireless terminal may also be downloaded to the computer together with the SUA program.

Yet in another example, a computer readable recording medium records instructions which, when executed by a processor of a wireless terminal, cause the processor to perform several functions. When the wireless terminal is connected to a computer, for example, a PC, the processor of the wireless terminal detects the connection and determines whether the connection is the first time for connection of the wireless terminal to the computer. When the connection is the first time connection, the processor of the wireless terminal obtains information of the wireless terminal software of the wireless terminal, and causes the computer to access a server via a network and to download a software upgrading assistance (SUA) program from the server which assists update of the wireless terminal software.

The instructions recorded on the computer readable recording medium may further cause the processor of the wireless terminal to perform the following function. When the processor determines that the connection is the second time or later connection, the processor of the wireless terminal causes the computer to execute the downloaded SUA program which has already been downloaded to the computer.

When the SUA is downloaded, a device driver for the wireless terminal may also be downloaded to the computer together with the SUA program.

The computer readable recording medium may be a non-transitory computer readable storage medium, such as a hard disk drive, a ROM, a RAM, a Flash memory, or optical/magnetic disks including CD-ROM, DVD-ROM and Blue-Ray® disks. The programs stored in such storage media may be transferred over a network including the Internet, after being read out from the storage medium.

The present method and equipment, together with further objects and advantages, can be better understood by reference to the following detailed description and the accompanying drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and devices disclosed herein relate to updating wireless terminal software installed on the wireless terminal. Reference now is made in detail to the examples illustrated in the accompanying drawings and discussed below.

Figure 1:
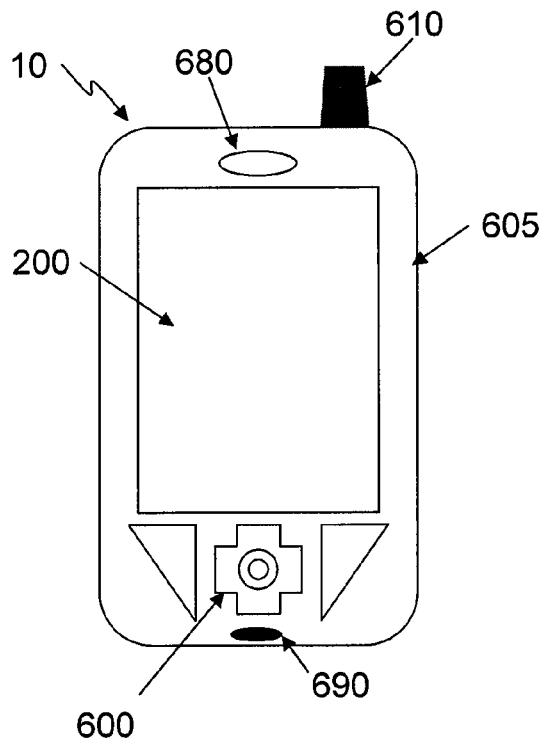
FIG. 1 is a front view of an exemplary wireless terminal.

FIG. 1 illustrates the front view of an exemplary wireless terminal. In the example, the wireless terminal 10 is a touch sensitive "smart" cellular phone. Although those skilled in the art will appreciate that the software updating technique may be implemented with any other type of wireless terminal, the exemplary terminal includes a main body 605, input keys 600, antenna 610, a speaker 680, a microphone 690 and a touch panel display 200. The configuration of the wireless terminal elements is not limited to the arrangement shown in FIG. 1.

Figure 2:
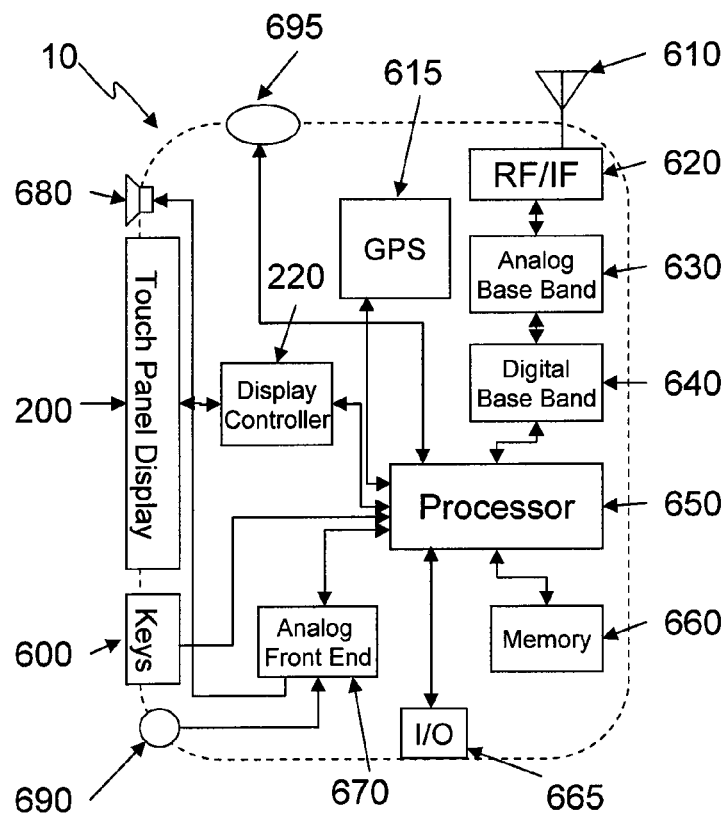
FIG. 2 is an exemplary block diagram of components of a wireless terminal.

FIG. 2 shows an exemplary block diagram of elements of the wireless terminal 10 of FIG. 1. The wireless terminal 10 includes an RF interface 620 connected to the antenna 610, an analog base band processor 630 and a digital base band processor 640 connected to a processor 650. A display controller or driver 220 is connected to the touch panel display 200 and the processor 650 for controlling the touch panel display 200. An analog front end processor 670 is connected to the processor 650 for controlling the speaker 680 and the microphone 690. The processor 650 in configured to control the display controller 220, RF circuits (620, 630 and 640), the analog front end processor, and an I/O circuit 665. Of course, the wireless terminal 10 may further include a GPS receiver 615.

The processor 650 also connects to memory 660 as a storage medium. The memory 660, for example, may include a RAM, a ROM or a flash memory. The memory 660 may store any number of wireless terminal software modules including an operating system, carious drivers and application programs. The memory 660 also stores a downloading program which is used in implementing the method for updating wireless terminal software on a wireless terminal as disclosed herein, specifically for downloading a software update assisting program to a PC. All or a part of the wireless terminal circuitry may be so structured or configured by hardware logic to perform the method.

Figure 3:
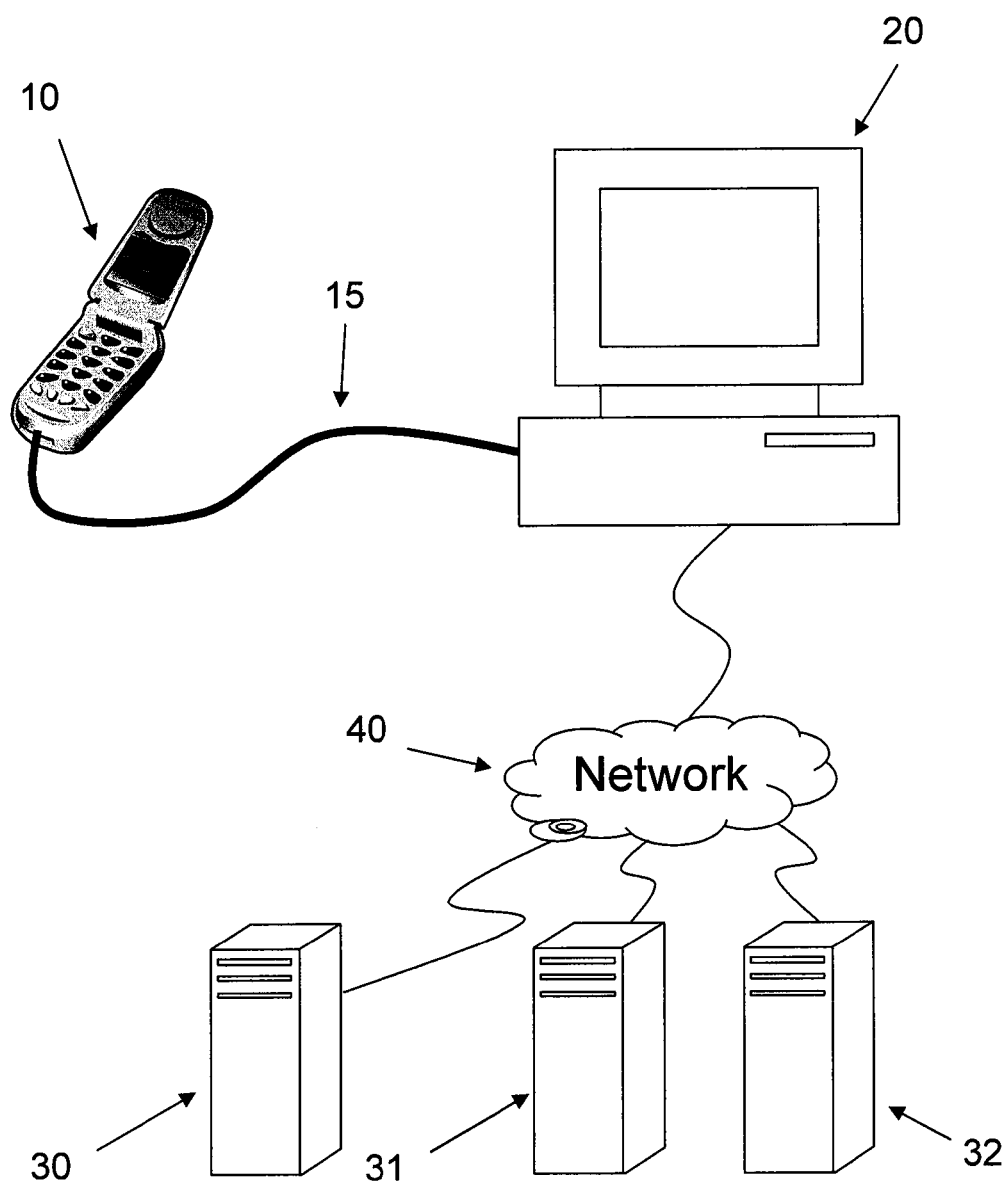
FIG. 3 is an exemplary diagram of a computer connected with the wireless terminal.

FIG. 3 is an exemplary diagram of a computer connected with the wireless terminal. The wireless terminal 10 is connectable to a computer, for example, a PC 20 via a cable 15. The connection may be established according to the USB standard. The PC 20 is also connected to a network 40, for example, the Internet, via a high-speed network connection, for example, a digital subscriber line (DSL) network, an optical fiber network or a cable network. Through the network 40, the PC 20 is able to access servers 30, 31 or 32, the details of which will be described below.

Figure 4:
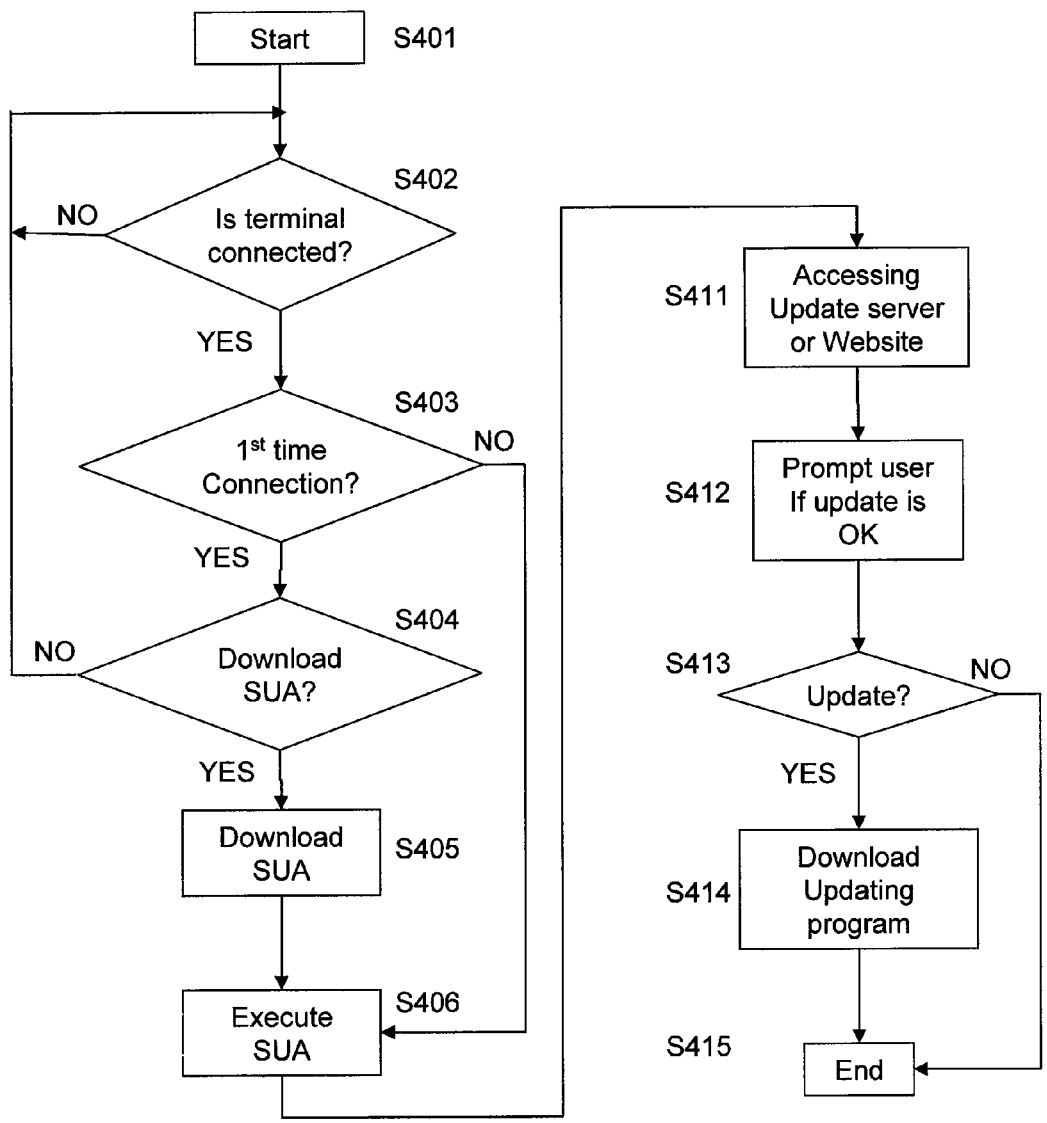
FIG. 4 is an example of a procedure for downloading and executing the SUA program.

FIG. 4 is an example of a procedure for downloading and executing the SUA program. Software installed on the wireless terminal sometimes needs to be upgraded or updated, for example, to fix problems in the software or to add new features to the software. In such a case, conventionally, vendors of the wireless terminal or the software may notify of the user of the wireless terminal of the necessity of updating. Such a notification may be sent to the user via e-mail, physical mail or a text message. Further, in the conventional method, tools for upgrading the terminal software may be provided to the user via a CD in the box, and the user may have to install the tools from the CD to the computer. In another conventional method, the user may be instructed to manually access a website to download the tools for upgrading.

In the present disclosure, even if the user does not receive such a notification, the user can still update the wireless terminal software by simply connecting the wireless terminal to the PC 20, and downloading and utilizing the SUA program as disclosed herein.

When the user receives the notification, according to the instruction, the user connects the wireless terminal 10 to the PC 20 (S401). The downloading program, which has been installed in the wireless terminal and is executed as a resident program, detects such a connection (S402). The wireless terminal 10 may periodically check if the wireless terminal is connected to a PC. When the wireless terminal 10 detects the connection, the wireless terminal determines whether the connection is the first time for connection of the wireless terminal 10 to the PC 20 (S403). The wireless terminal may determine whether the connection is the first time by, for example, checking if the software upgrading assistance (SUA) program has already been installed in the PC 20. The wireless terminal may determine whether the connection is the first time by checking a record stored in the memory of the wireless terminal which records past connections to computers. The record may include time and date of the past connections and/or identification information of the computers to which the wireless terminal has been connected.

If the connection is determined as the first connection to the PC 20, the wireless terminal may obtain information of wireless terminal software installed on the wireless terminal. The hardware information of the wireless terminal may also be obtained by the wireless terminal and may be sent to the PC 20.

Then, the wireless terminal 10 causes the PC 20 to access a server 30 via the network 40 and to download to the computer 20 the software upgrading assistance (SUA) program from the server 30 which assists update of the wireless terminal software (S405). To facilitate the downloading of the SUA program, the wireless terminal may transfer a small piece of software which assists downloading the SUA program. It may be more user friendly if before downloading the SUA program, the wireless terminal 10 inquires of the user of the PC 20 whether the user wishes to download the software upgrading assistance program (S404). Such an inquiry may be displayed on a monitor of the PC 20.

When the user inputs an affirmative response to the PC 20, the SUA program is downloaded to the PC 20 (S405). If user inputs a negative response at the step S404, the process may return to the step S402.

When the SUA program is downloaded, a device driver for the PC to drive the wireless terminal or other necessary programs, tools or data may also be downloaded from the server 30. The SUA program includes a utility tool (UT) and a monitor tool (MT). The UT may manage downloading the update programs and the MT may monitor the availability of the update programs. When the MT is executed by the computer, the MT becomes a resident program and will be present on the computer's task tray or task bar.

When the SUA has been downloaded to the PC, the SUA program is executed on the PC 20. The PC 20 determines, by executing the UT of the SUA program, whether the wireless terminal software should be updated or not. The PC may access websites provided by servers 31 or 32 designated by the SUA program to check for availability of the updating program (S411). The website provided by the server 31 may be a website of a manufacture of the wireless terminal, and the website provided by the server 32 may be a website of a vender of the wireless terminal software. The server 30 may be the same as the servers 31 or 32 when, for example, the manufacturer of the terminal or the software vender also provides the SUA program.

When the PC determines that the wireless terminal software should be updated and updating program is available, the PC may inquire of the user of the PC 20 whether the user wishes to update the wireless terminal software or not (S412). When the user inputs an affirmative response to the PC 20 (S413), the updating program for updating the wireless terminal software is downloaded from the server 31 or 32, and is executed to update the software (S414). The downloading of the updating program may be performed in the background of operations of the PC 20.

The downloading program may be an updated version of the wireless terminal software or may be a program that initiates downloading of the updated version. If the user inputs a negative response at the step S413, the process may be terminated.

Once the MT of the SUA program is downloaded and executed on the PC, the MT may periodically check for availability of the updating program for the wireless terminal software. Such a periodic check may be performed in the background of operations of the PC 20. If the MT finds that an updating program is available, the UT of the SUA program may follow the steps S412 to S415 at the next time the user connects the wireless terminal 10 to the PC 20.

On the other hand, if at the step S403, the wireless terminal determines that that the connection is a second time or later connection, the SUA program which has already been downloaded to the PC 20 is executed (S406). In some cases, the PC 20 may already be executing the MT of the SUA program. The executed SUA program follows the steps of S411 to S415. The executed MT may check the version of the wireless terminal software to determine if the updating is necessary.

The PC 20 and the downloaded SUA program may accept multiple wireless terminals. In such a case, the SUA program or the PC may have a record indicating that time and date of the last connection of the wireless terminal and identification information of the wireless terminals. The identification information of the wireless terminal may include a mobile directory number (MDN) and a serial number. When one of the wireless terminals which has been connected to the PC 20 is re-connected to the PC 20, the SUA program identifies the wireless terminal now connected and checks if the updating program for the wireless terminal now connected is available or not. Such a connection may trigger the SUA program to check if the updating program for other wireless terminals is available or not.

The user may manually operate the MT to check the availability of the updating program and download the updating program to update the wireless terminal software.

When a new device (i.e., wireless terminal) is connected to the PC 20 bur has the same MDN as an old device, the SUA automatically deletes the information about the old device and replaces it with information about the new device.

The method for updating wireless terminal software on a wireless terminal disclosed herein provides numerous advantages over conventional updating methods. For example, the disclosed method minimizes the customer's work or process to update the software on the wireless terminal, and makes the updating more efficient.

As shown by the above discussion, at least some implementations for updating of software on a wireless terminal may involve programming, for example, for the processor of the wireless terminal and/or for the computer. Program aspects of the technology may be thought of as "products" or "articles of manufacture" typically in the form of executable code and/or associated data that is carried on or embodied in a type of computer readable recording medium. "Storage" or "recording" type media include any or all of the memory of the supporting electronics of the terminal or server that executes the respective program, such as various semiconductor memories, tape drives, disk drives and the like, which may provide storage at any time for the software programming. All or portions of the software may at times be communicated through the Internet, the wireless network serving the terminals or various other telecommunication networks. Such communications, for example, may enable loading of the software from one computer or processor into another computer or processor, for example, from a host or management server into the download server or into the wireless terminal devices.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

What is claimed is:

1. A method for updating wireless terminal software on a wireless terminal, the method comprising steps of:
    detecting, by the wireless terminal, a wired connection of the wireless terminal to a computer;
    determining, by the wireless terminal, whether the wired connection is a first time for connection of the wireless terminal to the computer;
    upon determining that the wired connection is the first time connection:
        obtaining, by the wireless terminal, information of the wireless terminal software of the wireless terminal;
        causing, by the wireless terminal, the computer to access a server via a network and to download to the computer a software upgrading assistance program from the server which assists update of the wireless terminal software;
        collecting information on software available for the wireless terminal, by executing the downloaded software upgrading assistance program on the computer, to determine whether the wireless terminal software should be updated;
        upon determining that the wireless terminal software should be updated, inquiring of a user of the computer whether the user wishes to update the wireless terminal software; and
        upon receiving an input from the user indicating that the user wishes to update, updating the wireless terminal software on the wireless terminal by downloading an updating program from the server to the computer and executing the updating program on the computer; and
    upon determining that a connection of the wireless terminal to the computer is a second time or later connection:
        determining, by executing the downloaded software upgrading assistance program, whether the wireless terminal software should be updated; and
        upon determining that the wireless terminal software should be updated, updating the wireless terminal software on the wireless terminal by downloading an updating program from the server to the computer and executing the updating program on the computer,
    wherein the downloaded software upgrading assistance program periodically checks for availability of the updating program for the wireless terminal software.

2. The method of claim 1, wherein:
    when the downloaded software upgrading assistance program determines that the updating program is available, the downloaded software upgrading assistance program notifies the user of the availability.

3. The method of claim 1, wherein the downloaded software upgrading assistance program accesses a website designated by the downloaded software upgrading assistance program to check for availability of the updating program.

4. The method of claim 3, wherein the website is a website of a manufacturer of the wireless terminal.

5. The method of claim 3, wherein the website is a website of a vender of the wireless terminal software.

6. The method of claim 1, wherein upon determining that the connection of the wireless terminal to the computer is the second time or later connection and upon determining that the wireless software should be updated:
    inquiring of the user of the computer whether the user wishes to update the wireless terminal software; and
    updating the wireless terminal software on the wireless terminal upon receiving an input from the user indicating that the user wishes to update.

7. The method of claim 1, further comprising a step of:
    before the downloading of the software upgrading assistance program, inquiring of the user of the computer whether the user wishes to download the software upgrading assistance program,
    wherein the software upgrading assistance program is downloaded responsive to receiving an input from the user indicating that the user wishes to download the software upgrading assistance program.

8. The method of claim 1, wherein a device driver for the wireless terminal is downloaded together with the software upgrading assistance program.

9. A wireless terminal, comprising:
    a wireless transceiver for communication via a wireless network;
    a processor coupled to the wireless transceiver; and
    a storage device storing programs including wireless terminal software and a downloading program,
    wherein the downloading program includes instructions which, when executed by the processor, cause the wireless terminal to perform functions including functions to:
    detect a wired connection of the wireless terminal to a computer;
    determine whether the wired connection is a first time for connection of the wireless terminal to the computer;
    upon a determination that the wired connection is the first time connection, obtain information of the wireless terminal software of the wireless terminal, to cause the computer to access a server via a network and to download a software upgrading assistance program from the server to the computer which assists update of the wireless terminal software, the wireless terminal software on the wireless terminal being updated by executing an updating program downloaded to the computer from the server via the software upgrading assistance program; and
    upon a determination that a connection of the wireless terminal to the computer is a second time or later connection, cause the computer to determine, by executing the downloaded software upgrading assistance program, whether the wireless terminal software should be updated and, upon a determination that the wireless terminal software should be updated, update the wireless terminal software on the wireless terminal by executing an updating program downloaded to the computer from the server via the software assistance program,
    wherein the downloaded software upgrading assistance program causes the computer to periodically check for availability of the updating program for the wireless terminal software.

10. The wireless terminal of claim 9, wherein a device driver for the wireless terminal is downloaded together with the software upgrading assistance program.

11. The wireless terminal of claim 9, wherein the downloaded software upgrading assistance program causes the computer to access a website designated by the downloaded software upgrading assistance program to check for the availability of the updating program.

12. The wireless terminal of claim 11, wherein the website is a website of at least one of a manufacturer of the wireless terminal or a vender of the wireless terminal software.

13. The wireless terminal of claim 9, wherein:
when the downloaded software upgrading assistance program determines that the updating program is available, the downloaded software upgrading assistance program causes the computer to notify the user of the availability of the updating program.

14. The wireless terminal of claim 9, wherein upon determining that the connection of the wireless terminal to the computer is the second time or later connection and upon determining that the wireless software should be updated, the downloaded software upgrading assistance program causes the computer to:
inquire of the user of the computer whether the user wishes to update the wireless terminal software; and
update the wireless terminal software on the wireless terminal upon receiving an input from the user indicating that the user wishes to update.

15. A non-transitory computer readable recording medium recording instructions which, when executed by a processor of a wireless terminal, cause the processor to perform functions including functions to:
detect a wired connection of the wireless terminal to a computer;
determine whether the wired connection is a first time for connection of the wireless terminal to the computer;
upon a determination that the wired connection is the first time connection, obtain information of a wireless terminal software of the wireless terminal, to cause the computer to access a server via a network and to download to the computer a software upgrading assistance program from the server, the wireless terminal software on the wireless terminal being updated by executing an updating program downloaded to the computer from the server via the software upgrading assistance program; and
upon a determination that a connection of the wireless terminal to the computer is a second time or later connection, cause the computer to determine, by executing the downloaded software upgrading assistance program, whether the wireless terminal software should be updated and, upon a determination that the wireless terminal software should be updated, update the wireless terminal software on the wireless terminal by executing an updating program downloaded to the computer from the server via the software assistance program,
wherein the downloaded software upgrading assistance program causes the computer to periodically check for availability of the updating program for the wireless terminal software.

16. The non-transitory computer readable recording medium of claim 15, wherein a device driver for the wireless terminal is downloaded together with the software upgrading assistance program.

17. The non-transitory computer readable recording medium of claim 15, wherein the downloaded software upgrading assistance program causes the computer to access a website designated by the downloaded software upgrading assistance program to check for the availability of the updating program.

18. The non-transitory computer readable recording medium of claim 17, wherein the website is a website of at least one of a manufacturer of the wireless terminal or a vender of the wireless terminal software.

19. The non-transitory computer readable recording medium of claim 15, wherein:
when the downloaded software upgrading assistance program determines that the updating program is available, the downloaded software upgrading assistance program causes the computer to notify the user of the availability of the updating program.

20. The non-transitory computer readable recording medium of claim 15, wherein upon determining that the connection of the wireless terminal to the computer is the second time or later connection and upon determining that the wireless software should be updated, the downloaded software upgrading assistance program causes the computer to:
inquire of the user of the computer whether the user wishes to update the wireless terminal software; and
update the wireless terminal software on the wireless terminal upon receiving an input from the user indicating that the user wishes to update.

\* \* \* \* \*